US012566085B2

(12) United States Patent
Cortadellas et al.

(10) Patent No.: US 12,566,085 B2
(45) Date of Patent: \*Mar. 3, 2026

(54) CONTAINER FOR DOSING A FLOWABLE SOLID

(71) Applicant: PepsiCo, Inc., Purchase, NY (US)

(72) Inventors: Xavier Cortadellas, Hallandale Beach, FL (US); Syed Peer, Hoffman Estates, IL (US); Toby Richard David Wingfield, Crystal Lake, IL (US); Albert Kwak, Brooklyn, NY (US); Charles Simon Paradise, Brooklyn, NY (US); Emma Pearl Willmer-Shiles, Brooklyn, NY (US)

(73) Assignee: PepsiCo, Inc., Purchase, NY (US)

( * ) Notice: Subject to any disclaimer, the term of this patent is extended or adjusted under 35 U.S.C. 154(b) by 317 days.

This patent is subject to a terminal disclaimer.

(21) Appl. No.: 18/295,006

(22) Filed: Apr. 3, 2023

(65) Prior Publication Data

US 2023/0236054 A1 Jul. 27, 2023

Related U.S. Application Data

(63) Continuation of application No. 17/457,368, filed on Dec. 2, 2021, now Pat. No. 11,619,533.

(51) Int. Cl.
B65D 47/26 (2006.01)
A47G 19/34 (2006.01)
(Continued)

(52) U.S. Cl.
CPC ............ G01F 11/261 (2013.01); A47G 19/34 (2013.01); B65D 47/266 (2013.01); B65D 83/06 (2013.01); G01F 11/12 (2013.01)

(58) Field of Classification Search
CPC ....... G01F 11/261; G01F 11/12; B65D 83/06; B65D 47/266; A47G 19/34
See application file for complete search history.

(56) References Cited

U.S. PATENT DOCUMENTS 2,537,415 A * 1/1951 Loeb ........................ A47K 5/10
222/340
2,665,036 A * 1/1954 Riva ..................... G01F 11/261
222/196
(Continued)

FOREIGN PATENT DOCUMENTS

EP 0 492 534 A1 7/1992
GB 827 688 A 2/1960
(Continued)

*Primary Examiner* — Frederick C Nicolas
(74) *Attorney, Agent, or Firm* — Sterne, Kessler, Goldstein & Fox P.L.L.C.

(57) ABSTRACT

Embodiments are directed to a container for dispensing equal doses of a flowable solid. The container may include a body defining an interior volume including a storage volume, an outlet passage, and a dosing chamber in communication with the storage volume and the outlet passage. The container may include a closure that has a lid and a plunger. The lid may be rotatably coupled to the body such that it rotates about a first axis from a closed position to an open position. The plunger may be rotatably coupled to the lid and configured to seal the dosing chamber. The container may be configured to dispense a dose of the flowable solid when the plunger is in the unsealed position and the container is at least partially inverted, and each dose may have an equal volume.

20 Claims, 7 Drawing Sheets

(51) Int. Cl.
B65D 83/06 (2006.01)
G01F 11/12 (2006.01)
G01F 11/26 (2006.01)

(56) References Cited

U.S. PATENT DOCUMENTS

| 2,792,155 | A | * | 5/1957 | Bellardi | A47G 19/34 |
| | | | | | 222/266 |
| 2,837,250 | A | | 6/1958 | Irven | |
| 2,952,392 | A | | 9/1960 | Matter | |
| 3,146,921 | A | * | 9/1964 | Brady | A47G 19/34 |
| | | | | | 222/542 |
| 3,148,804 | A | * | 9/1964 | James | G01F 11/262 |
| | | | | | 222/443 |
| 3,344,962 | A | * | 10/1967 | Popivalo | G01F 11/261 |
| | | | | | 222/456 |
| 3,840,159 | A | * | 10/1974 | Downey | A47G 19/34 |
| | | | | | 222/509 |
| 4,024,996 | A | | 5/1977 | Dalke | |
| 4,144,989 | A | | 3/1979 | Joy | |
| 4,394,941 | A | * | 7/1983 | Recine | G01F 11/18 |
| | | | | | 222/361 |
| 4,516,701 | A | * | 5/1985 | Tribble | G01F 11/025 |
| | | | | | 222/509 |
| 4,724,984 | A | * | 2/1988 | Wilken | B65D 83/0409 |
| | | | | | 222/453 |
| 4,991,748 | A | * | 2/1991 | Hackmann | B65D 83/0409 |
| | | | | | 222/361 |
| 5,067,637 | A | | 11/1991 | Aurness et al. | |
| 5,078,305 | A | | 1/1992 | Glynn et al. | |
| 5,386,929 | A | | 2/1995 | Dutt et al. | |
| 5,492,249 | A | | 2/1996 | Beach | |
| 5,518,152 | A | | 5/1996 | Burcham et al. | |
| 5,944,224 | A | | 8/1999 | Hodge et al. | |
| 6,450,371 | B1 | * | 9/2002 | Sherman | G01F 11/18 |
| | | | | | 222/336 |
| 9,272,836 | B2 | * | 3/2016 | Ramachandran | B65D 47/06 |
| 9,585,503 | B2 | * | 3/2017 | Watson | B23P 19/00 |
| 11,619,533 | B1 | * | 4/2023 | Cortadellas | B65D 47/266 |
| | | | | | 222/71 |
| 2002/0145010 | A1 | | 10/2002 | Ufheil et al. | |
| 2006/0144872 | A1 | | 7/2006 | Israel et al. | |
| 2007/0262097 | A1 | | 11/2007 | Antal | |
| 2011/0278329 | A1 | | 11/2011 | Enns | |
| 2012/0248117 | A1 | | 10/2012 | Corbett et al. | |
| 2014/0312075 | A1 | | 10/2014 | Antal et al. | |
| 2015/0330823 | A1 | | 11/2015 | Watson | |

FOREIGN PATENT DOCUMENTS

| JP | H09-272557 A | 10/1997 |
| JP | H11-130166 A | 5/1999 |

* cited by examiner

1000

| OPENING THE LID | 1010 |

| TILTING THE CONTAINER TO SEPARATE A DOSE | 1020 |

| INVERTING THE CONTAINER TO DISPENSE A DOSE | 1030 |

| RETURNING THE CONTAINER TO AN UPRIGHT ORIENTATION | 1040 |

CONTAINER FOR DOSING A FLOWABLE SOLID

CROSS-REFERENCE

This application is a continuation of U.S. application Ser. No. 17/457,368, filed Dec. 2, 2021, which is incorporated herein in its entirety by reference thereto.

BACKGROUND

The present disclosure relates to containers for storing and dispensing a flowable solid (e.g., a powder or granules). More specifically, the present disclosure relates to containers for dispensing consistent and accurate doses of a flowable solid.

BRIEF SUMMARY

Some embodiments are directed to a container for dispensing a flowable solid, the container comprising: a body defining an interior volume, the interior volume comprising: a storage volume; an outlet passage; a dosing chamber in communication with the storage volume and the outlet passage; and a closure for sealing the container, the closure comprising: a lid rotatably coupled to the body, wherein the lid is configured to rotate about a first axis from a closed position to an open position; and a plunger rotatably coupled to the lid within a top quarter of a height of the container, wherein the plunger is configured to move in a direction of a second axis from a sealed position to an unsealed position when the lid is rotated about the first axis, wherein the second axis is perpendicular to the first axis, and wherein the plunger extends within the outlet passage to form a seal within a bottom quarter of the height of the container when the plunger is in the sealed position, wherein the container is configured to dispense a dose of the flowable solid when the plunger is in the unsealed position and the container is at least partially inverted, and wherein each dose has an equal volume.

In any of the various embodiments discussed herein, the container further comprises a partition separating the storage volume and the outlet passage In any of the various embodiments discussed herein, the partition extends below the bottom of the plunger when the plunger is in the sealed position.

In any of the various embodiments discussed herein, the dosing chamber is configured to contain a dose of the flowable solid.

In any of the various embodiments discussed herein, only the dose of the flowable solid is dispensed when the container is at least partially inverted and the plunger is in the unsealed position.

In any of the various embodiments discussed herein, the storage volume is configured to contain at least 10 doses of the flowable solid.

In any of the various embodiments discussed herein, when the plunger is in the unsealed position, a pathway is formed from past the plunger from the dosing chamber to the outlet.

In any of the various embodiments discussed herein, the plunger comprises a sealing base configured to contact a wall of the outlet passage when the plunger is in the sealed position such that the dosing chamber is sealed.

In any of the various embodiments discussed herein, the width of the outlet passage increases along the second axis such that when the plunger is in the unsealed position an exit path is defined by the outlet passage and the plunger.

In any of the various embodiments discussed herein, the body comprises a detent configured to limit rotation of the lid when the lid is in the closed position.

In any of the various embodiments discussed herein, the lid comprises an opening configured to engage with the detent when the lid is in the open position.

In any of the various embodiments discussed herein, the lid rotates from a closed position to an open position when a force is applied to the lid.

In any of the various embodiments discussed herein, the container further comprises a base coupled to the body, the base defining a floor of the storage volume and a floor of the dosing chamber.

In any of the various embodiments discussed herein, the base further comprises a partition extending into the storage volume such that the partition restricts the flow of the flowable solid from the storage volume when the container is at least partially inverted.

In any of the various embodiments discussed herein, the container is recyclable in a single recycling stream.

Some embodiments are directed to a container for dispensing a flowable solid, the container comprising: a body comprising an interior volume, the interior volume comprising a storage volume, an outlet passage, and a dosing chamber, the dosing chamber in communication with the storage volume and the outlet passage; and a partition separating the storage volume from the outlet passage; and a closure for sealing the container, the closure comprising a lid and a plunger, wherein, in response to a force applied to the lid, the lid is configured to move from a closed position to an open position such that the plunger moves upwards from a sealed position an unsealed position to expose an exit path in the outlet passage, and wherein, when the exit path is exposed and the container is in an inverted orientation, the container is configured to dispense only a single dose through the outlet.

In any of the various embodiments discussed herein, when the plunger is in the sealed position the plunger forms a seal within a bottom quarter of a height of the container.

In any of the various embodiments discussed herein, the lid is configured to rotate about a first axis from the closed position to the open position, and the plunger is rotatably coupled to the lid within a top quarter of the height of the container.

In any of the various embodiments discussed herein, the force is a downward force, and the plunger is configured to move upwards along a second axis that is perpendicular to the first axis in response to the downward force applied to the lid.

In any of the various embodiments discussed herein, the container further comprises a base removably coupled to the body, the base defining a floor of the storage volume and the dosing chamber.

In any of the various embodiments discussed herein, the base comprises a partition extending from the base into the storage volume when the base is coupled to the body.

In any of the various embodiments discussed herein, the plunger comprises a protrusion that contacts a wall of the outlet passage when the plunger is in the sealed position such that the dosing chamber is sealed, and wherein the sealing base is spaced apart from the wall of the outlet passage when the plunger is in the unsealed position such that a path is formed through which the dose is dispensed.

In any of the various embodiments discussed herein, the plunger comprises a flange, wherein the flange contacts a side of the lid when the lid is in the open position.

In any of the various embodiments discussed herein, the plunger is integral with the lid, and the lid and the plunger are configured to move upward in response to an upward force applied to the lid.

BRIEF DESCRIPTION OF THE FIGURES

The accompanying drawings, which are incorporated herein and form part of the specification, illustrate the present disclosure and, together with the description, further serve to explain the principles of the disclosure and to enable a person skill in the relevant art to make and use the invention.

DETAILED DESCRIPTION

Figure 1:
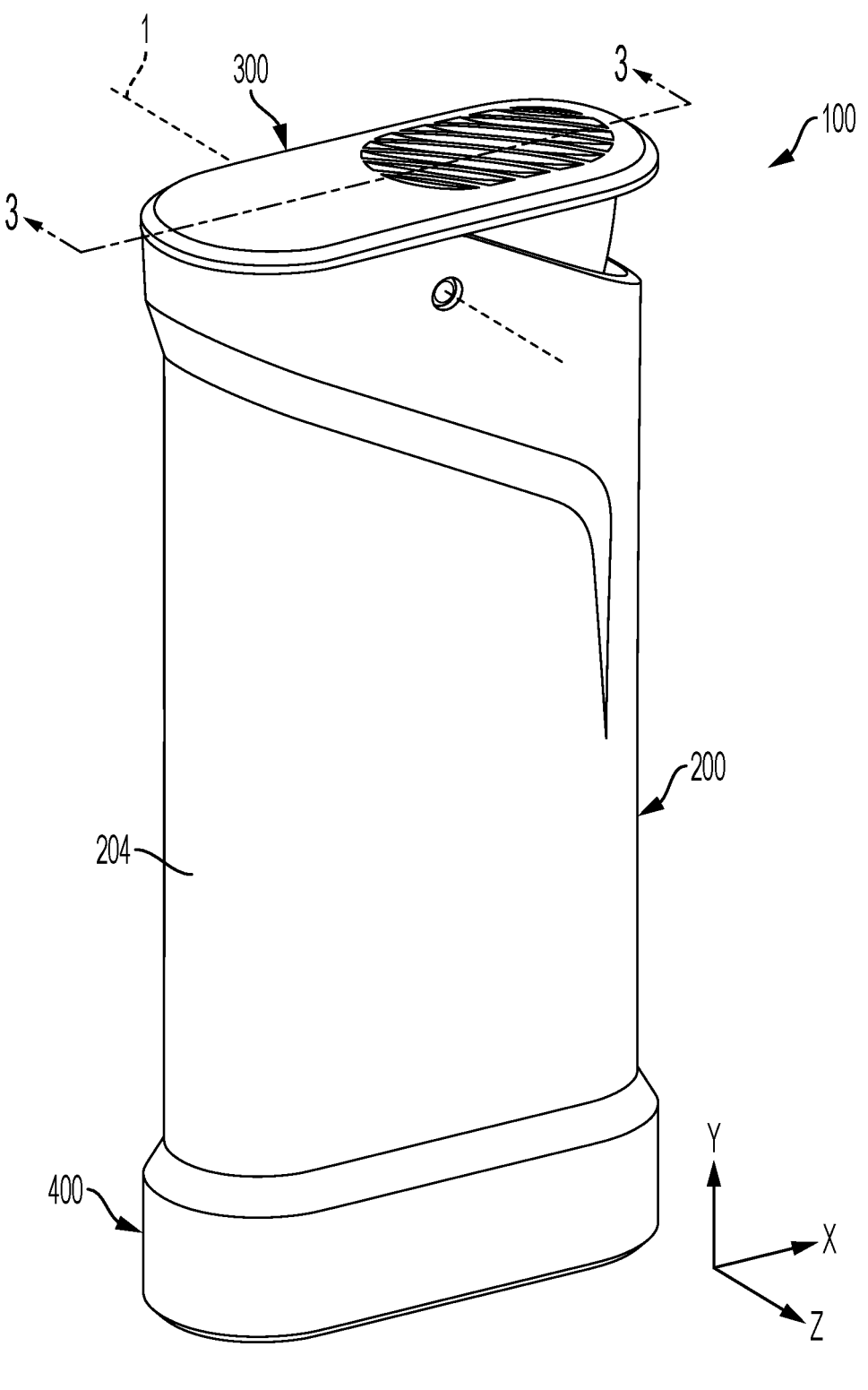
FIG. 1 is a perspective view of a container according to some embodiments.

Flowable solids, such as powders and granules may be used for beverage concentrates, sugar, etc. Flowable solids are often sold in bulk in large containers. Not only is it difficult to accurately remove a consistent amount of flowable solids from these containers, doing so can be messy and slow. For example, to accurately remove a dose of powder, a user may have to use a scoop to remove the powder. But the scoop may remove excess powder (requiring the user to level the powder to get an accurate amount or dose of the powder) or too little powder (requiring the user to scoop again to get an accurate amount or dose of the powder). Or to achieve an accurate dose in a single scoop, a user may have to scoop an excess amount, then use another tool or the user's fingers to level the powder. These scoops are often stored in the container itself and thus may become coated by powder or other substances.

Other dispensers may allow a user to dispense the powder without a scoop, but may provide little control over the amount dispensed. For example, containers with spouts (e.g., sugar dispensers) can dispense powder by pouring, but aside from estimating how much has been poured, there is no reliable way to control the amount of sugar dispensed, and the accuracy of the pour changes with the flow rate of the powder as the volume of powder remaining in the container decreases. Further, users may have to touch the spout to open and allow flow of powder.

Moreover, large containers as described above may not be easily transportable for on-the-go use. And existing on-the-go applications use individual packets, which are often single-use packets containing a small amount of the powder. But these packets can be messy and in some cases can easily rip and spill. Single-use packets also generate waste with each use.

Embodiments described herein overcome these and other challenges by providing—among other benefits—a container that consistently dispenses accurate doses of powder without measuring, regardless the amount of powder in the container, and that keeps an internal dosing mechanism clear while not in use, such as during transport, which may involve jostling around in a bag or other unintentional changes in orientation. To facilitate such transport, the container may be small enough to be carried in a pocket, purse, etc. for on-the-go use. Moreover, embodiments described herein allow for transport and storage of the container in any orientation when not in use.

As shown throughout the figures, some embodiments are directed to a container for storing, dosing, and dispensing a flowable solid. A flowable solid is a volume of material that is formed of solid fragments or chunks of the material such that the volume of material can flow (e.g., when poured or sufficiently tilted). Examples include powder or granules (e.g., granulated sugar or beverage concentrate).

For example, the container may include a closure and an interior volume. A partition may separate the interior volume into a storage volume and a passage. The passage may connect the storage volume to an outlet. The closure may include a lid and a plunger and move from a closed position to an open position. The plunger may be rotatably attached to the lid and extend deep into the passage. When the closure is moved from a closed position to an open position, the lid may rotate and plunger may move upward to open a flow path through which the flowable solid may flow. The container may be used to dose a consistent volume of powder from the storage volume and through the outlet, regardless the amount of powder remaining in the storage volume. The partition may create interior geometry of the container that allows for dosing a consistent volume of a powder. The plunger may keep flowable solid material from unintentionally entering the outlet passage when the lid is closed, to help maintain the accuracy of subsequent doses. The container may be small enough to be carried on-the-go but large enough to contain numerous doses of a flowable solid, eliminating the need for single-serve packets.

Containers (e.g., container 100) according to some embodiments may be designed for on-the-go use and include a dosing chamber (e.g., dosing chamber 120) that contains a fixed volume of a flowable solid (e.g., flowable solid 600) that will naturally re-fill itself from the storage volume. But because the dosing chamber refills by gravity and the outlet is near the top, flowable solid 600 needs to travel through a long passage (e.g., outlet passage 130) to get dispensed. If any flowable solid 600 unintentionally enters outlet passage 130 before dispensing, the size of the dose may be altered. To prevent flowable solid 600 from prematurely or unintentionally entering outlet passage 130 during on-the-go use (e.g., when the container may be jostled or bumped around during transport like in a purse or backpack), the container may include a sealing mechanism that is controlled from the top of the container to seal deep within the passage. The sealing mechanism may operate automatically in conjunction with opening or closing the lid, as described in more detail below.

Figure 2:
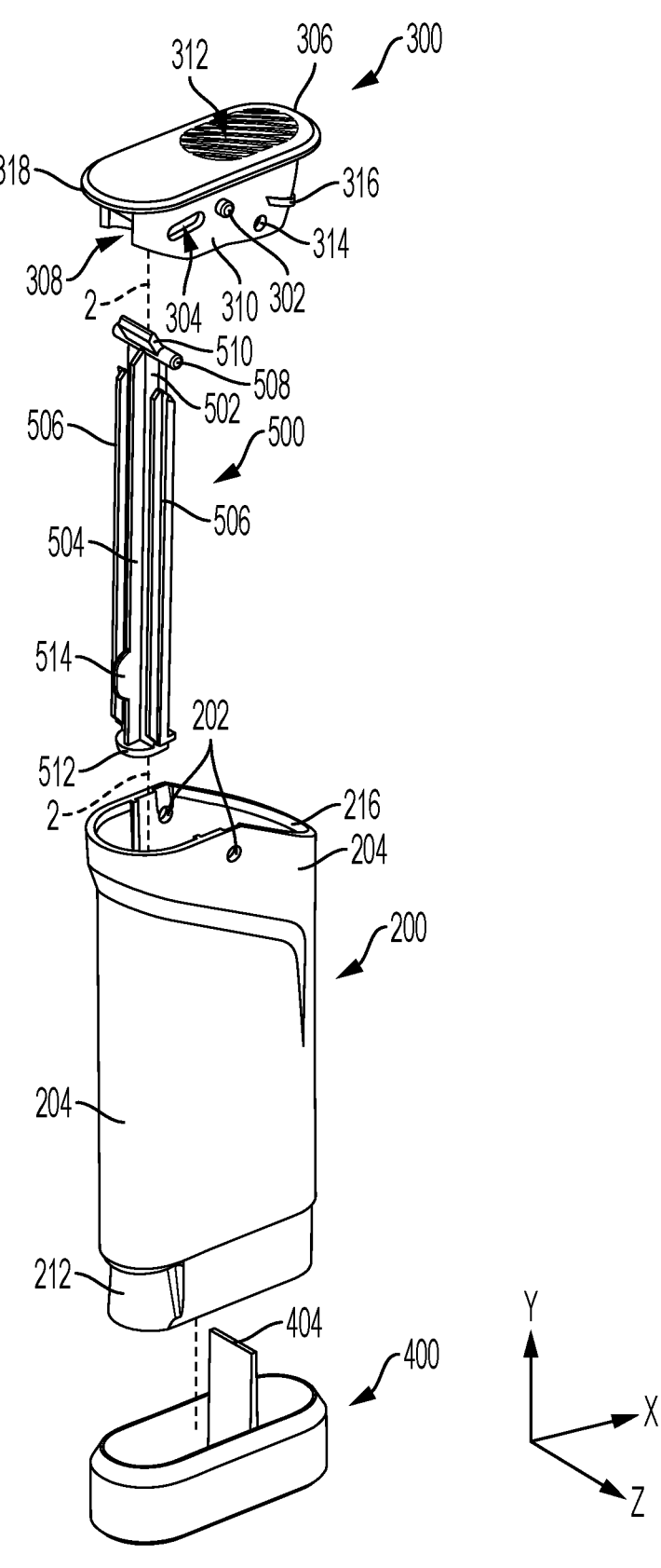
FIG. 2 is an exploded view of the container of FIG. 1.

FIG. 1 illustrates container 100 for dispensing powder. Container 100 may include body 200, lid 300, and base 400. Wall 204 of body 200 may contain an interior volume. Lid 300 may be rotatably coupled to body 200 and able to rotate from a closed position (as shown in FIG. 1) to an open position. Container 100 may include outlet 150 defined by body 200 and lid 300 when lid 300 is in an open position (see FIG. 3B). FIG. 2 shows an exploded view of container 100.

Figure 3A:
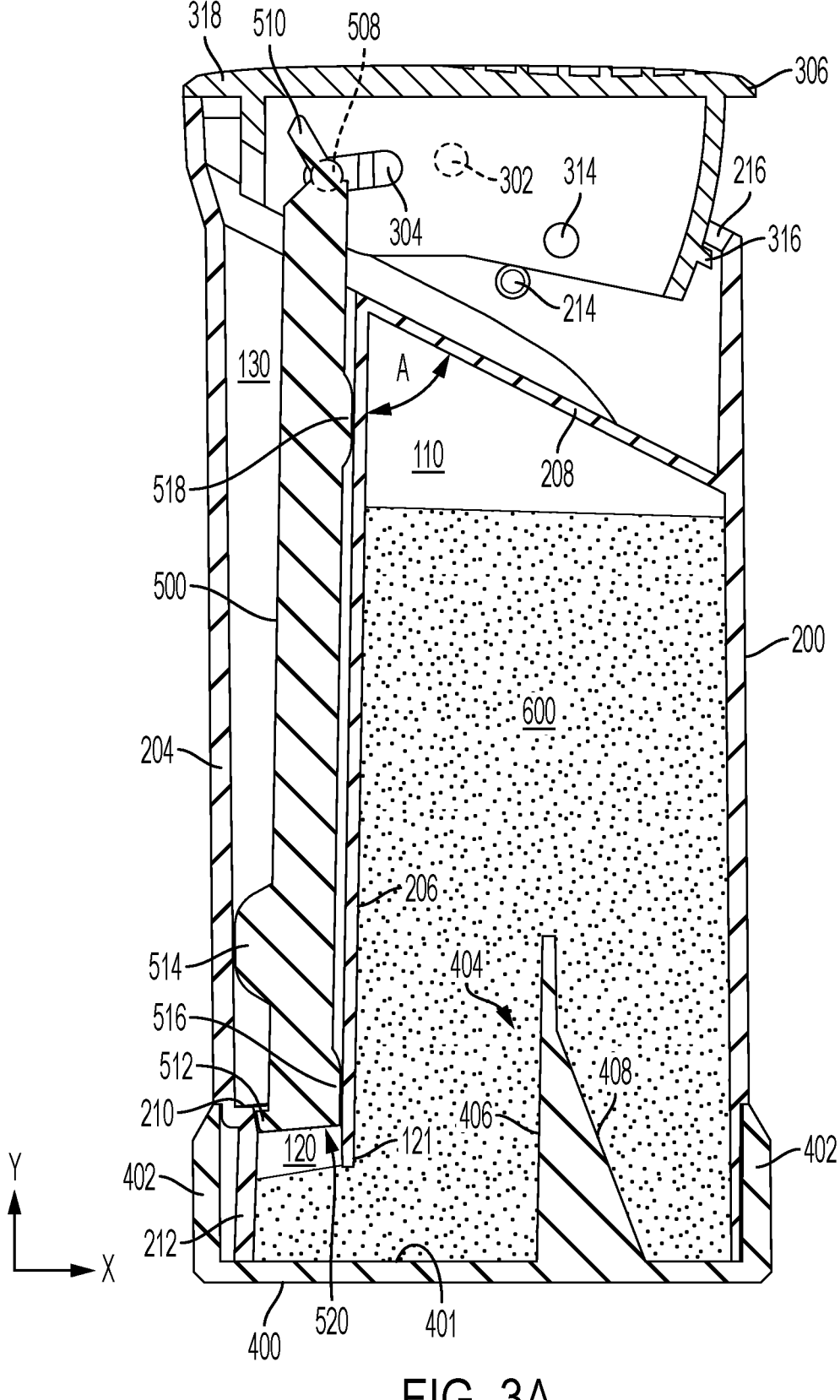
FIG. 3A is a cross-sectional view of the container of FIG. 1 in the closed position and with flowable solid in the container.
Figure 3B:
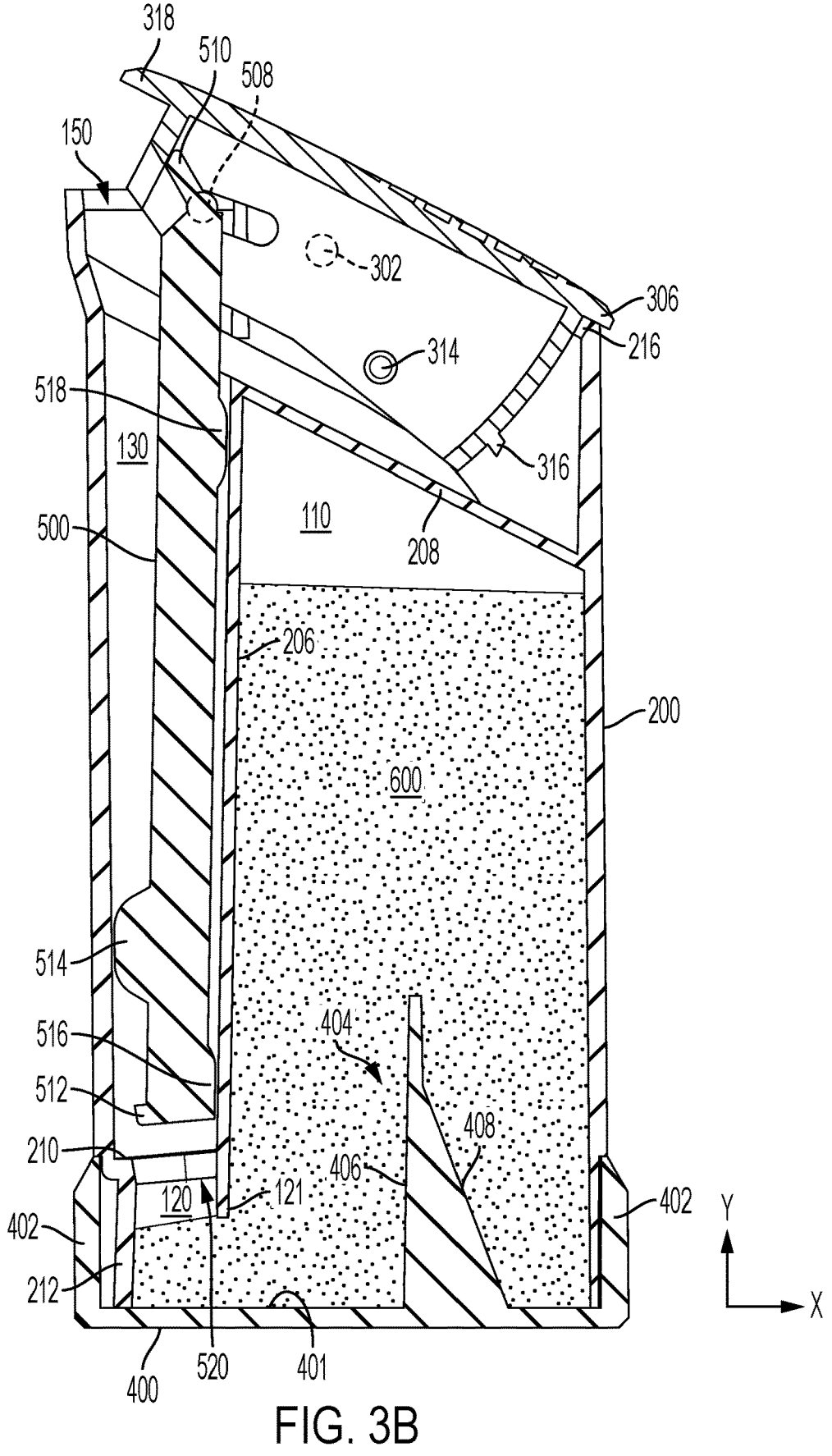
FIG. 3B is a cross-sectional view of the container of FIG. 1 in the open position and with flowable solid in the container.
Figure 3C:
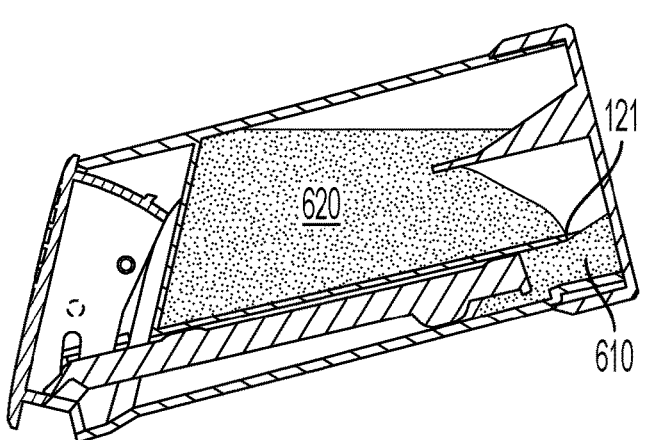
FIG. 3C illustrates tilting of the container of FIG. 1 to separate a dose from the remainder of the flowable solid.
Figure 3C:
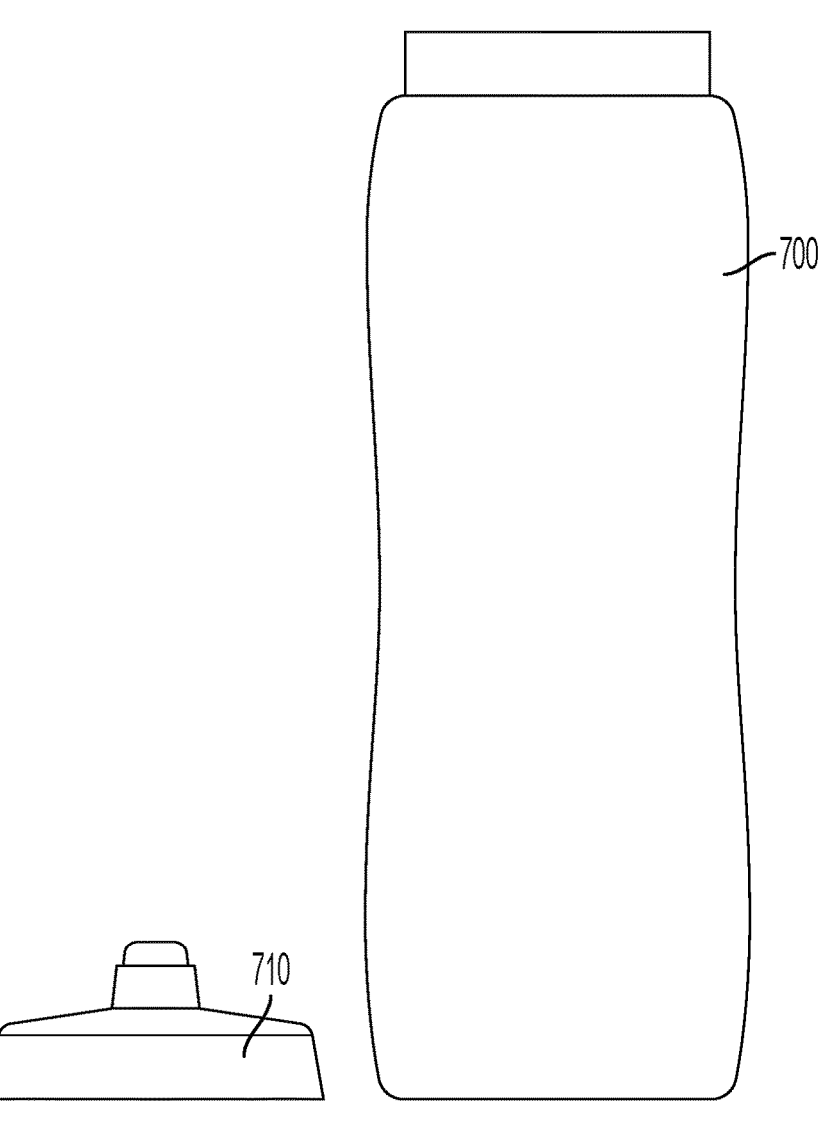
Figure 3D:
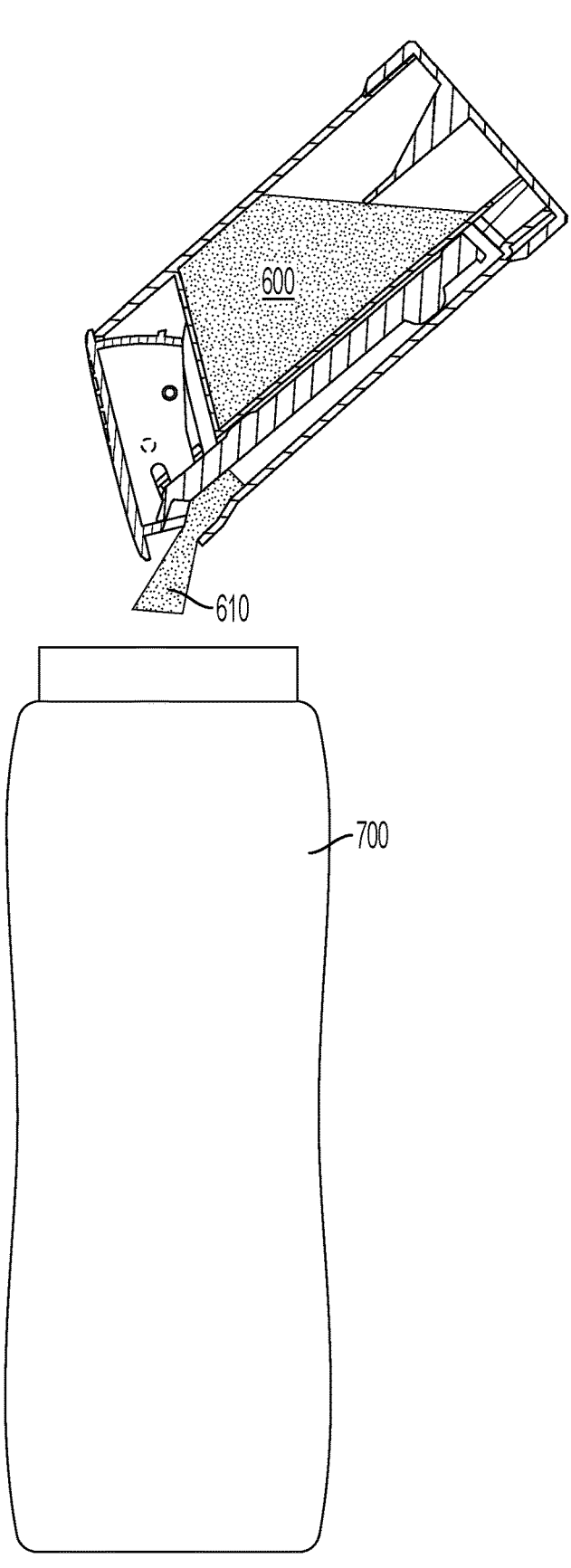
FIG. 3D illustrates inversion of the container of FIG. 1 to dispense the dose shown in FIG. 3C into a drinking vessel.

FIGS. 3A-3D show cross-sectional views of container 100 taken along line 3-3. FIG. 3A shows container 100 when lid 300 is in a closed position, FIG. 3B shows container 100 when lid 300 is in an open position, FIG. 3C shows container 100 in a tilted position, and FIG. 3D shows container 100 in an inverted position and dispensing powder into drinking vessel 700.

As shown in FIG. 2, container 100 may include body 200, lid 300, base 400, and plunger 500. Container 100 and its component parts may include a height dimension extending in a Y-direction, a length dimension extending in an X-direction, and a width dimension extending in a Z-direction.

With reference to FIG. 2 and FIG. 3A, body 200 may include holes 202, walls 204, partition 206, partition 208, ledge 210, lower portion 212, detents 214, and rim 216. Body 200 may include a pair of holes 202 formed in walls 204 and disposed on opposite sides of body 200. Body 200 may include lower portion 212 configured to mate with base 400. FIGS. 3A-3D illustrate a cross-sectional view of container 100 taken alone lines 3-3. As shown in FIGS. 3A-3D, container 100 may include an inner volume separated into storage volume 110, dosing chamber 120, and passage 130.

Body 200 may include partitions (e.g., partition 206 and partition 208). The partitions (e.g., partition 206 and partition 208) may be formed integrally with wall 204 to form body 200. In some embodiments, partition 206 is oriented vertically (i.e., it extends in the Y-direction), and partition 208 is oriented such that partition 206 and partition 208 form an acute angle A in storage volume 110. In some embodiments, angle A is between 30 degrees and 75 degrees (e.g., between 45 degrees and 65 degrees). In some embodiments, angle A is about 65 degrees. Partition 206 may be positioned such that when container 100 is at least partially tilted or inverted, partition 206 restricts the flow of flowable solid 600 (e.g., a powder or granules) from storage volume 110 toward passage 130. In some embodiments, partition 206 restricts the flow of flowable solid 600 so that, when lid 300 is in the open position, only one dose of flowable solid 600 is dispensed from container 100 each time container 100 is inverted (i.e., rotated greater than about 115 degrees).

Storage volume 110 may be in communication with outlet 150 through passage 130. Storage volume 110 may be configured to store a powder or granules (e.g., flowable solid 600 shown in FIGS. 3A-3D). In some embodiments, storage volume 110 has a capacity of about 25 mL to about 150 mL (e.g., about 35 mL to about 125 mL or about 50 mL to about 100 mL). In some embodiments, storage volume 110 has a capacity of about 50 mL. In some embodiments, storage volume 110 is sized to contain at least 10 doses of flowable solid 600. In some embodiments, storage volume 110 has a volume at least 10 times the volume of dosing chamber 120.

Body 200 may include ledge 210 positioned to cooperate with plunger 500 to seal storage volume 110 and dosing chamber 120 from passage 130. Dosing chamber 120 may hold a single dose of flowable solid 600. The dosing mechanism and structure can operate similarly to the dosing mechanism and structure of the container in U.S. patent application Ser. No. 17/193,811, which is incorporated herein in its entirety by reference thereto. For example, the dosing mechanism and structure can operate similarly to storage volume 115, lead-in passage 121, and dosing chamber 122 described in U.S. patent application Ser. No. 17/193, 811. In some embodiments, as detailed below, ledge 210 contacts the plunger 500 when lid 300 is in the closed position to seal storage volume 110 and dosing chamber 120.

Body 200 may include a pair of detents 214 that project inward from walls 204 of body 200. In some embodiments, detents 214 are disposed on opposite sides of body 200 in the Z-direction. As described in more detail below, in some embodiments, detents 214 are configured to couple with holes 314 of lid 300 when lid 300 is in the open position.

Body 200 may include rim 216 that projects inward from walls 204 and extends at least partially around the top of body 200. Rim 216 may be positioned to stop rotation of lid 300 as lid 300 rotates from the closed position to the open position. For example, as discussed in more detail below, in some embodiments, flange 306 contacts rim 216 to restrict rotation of lid 300.

Container 100 may include lid 300 coupled to body 200. As shown in FIG. 2, lid 300 may include protrusions 302, slots 304, upper flange 306, opening 308, walls 310, grips 312, holes 314, lower flange 316, and front flange 318. Lid 300 may include a pair of protrusion 302 that extend out from walls 310 and form an axis of rotation along axis 1. Protrusions 302 may be disposed on opposite sides of lid 300 along axis 1. In some embodiments, protrusions 302 engage with holes 202 of body 200. In some embodiments, holes 202 are formed through opposite sides of outer walls 204 of body 200. In some embodiments, holes 202 are positioned along axis 1.

Lid 300 may be rotatably coupled to body 200. In some embodiments, protrusions 302 extend through holes 202 to rotatably couple lid 300 to body 200. In some embodiments, lid 300 rotates about axis 1 from a closed position (e.g., as shown in FIG. 3A) to an open position (e.g., as shown in FIG. 3B). Upper flange 306 and lower flange 316 may each extend out from an outer surface of lid 300. In some embodiments, upper flange 306 and lower flange 316 extend out from lid 300 in a first direction, and rim 216 extends out from body 200 in a second direction that is opposite the first direction. Rim 216 may be disposed between upper flange 306 and lower flange 316 in the Y-direction to stop rotation of lid 300. In some embodiments, when lid 300 is in the closed position (e.g., as shown in FIG. 3A), a bottom surface of rim 216 contacts a top surface of lower flange 316 to prevent further rotation of lid 300. In some embodiments, when lid 300 is in the open position (e.g., as shown in FIG. 3B), a bottom surface of upper flange 306 contacts a top surface of rim 216 to prevent further rotation of lid 300.

As lid 300 rotates from the closed position to the open positions, holes 314 may releasably couple with detents 214. In some embodiments, holes 314 releasably couple with detents 214 to hold lid 300 in the open position to allow a user to dispense flowable 600 without having to hold lid 300 in the open position. In some embodiments, holes 314 may release from detents 214 by applying a downward force to lid 300 proximate to flange 318. Lid 300 may include a pair of slots 304. In some embodiments, slots 304 are disposed on opposite sides of lid 300 to accommodate rod 508 of plunger 500.

Container 100 may include base 400 coupled to or integrally formed with body 200. In some embodiments, base 400 is removably coupled to body 200 to allow for refilling container 100. In some embodiments, base 400 is fixedly coupled to body 200. In some embodiments, base 400 is integrally formed with body 200. Base 400 may allow container 100 to stand upright and improve stability of container 100 when not in use. Base 400 may include walls 402 that couple base 400 to body 200. In some embodiments, walls 402 surround lower portion 212 of body 200 when body 200 is coupled to base 400. Base 400 may include surface 401 that defines a floor of storage volume 110 and dosing chamber 120. In some embodiments, base 400 includes a partition 404 extending up from surface 401 and into storage volume 110. In some embodiments, partition 404 extends higher than the bottom of partition 206. The height and position of the partition may affect the size of the dose of flowable solid. Partition 404 may be spaced away from partition 206 in the X-direction. In some embodiments, partition 404 extends the entire width of storage volume 110. In some embodiments, partition 404 includes first side 406 extending substantially vertically and second side 408 angled relative to first side 406. The angle of second side 408 may help ensure that flowable solid 600 does not get stuck behind partition 404 when container 100 dispenses powder.

Container 100 may include plunger 500 configured to seal storage volume 110 and dosing chamber 120 from passage 130. In some embodiments, plunger is disposed at least partially in passage 130. Partition 206 may extend below the bottom surface 520 of plunger 500. In some embodiments, partition 206 extends below the bottom of plunger 500 by about 0.5 mm to about 5 mm (e.g., about 1 mm to about 2 mm). In some embodiments, partition 206 extends at least 1 mm below the bottom of plunger 500. Plunger 500 may have a longitudinal dimension in the Y-direction. Plunger 500 may include a central column 502, ribs 504 and 506, rod 508, flange 510, sealing base 512, and spacers 514, 516, and 518.

Plunger 500 may be configured to move up and down along axis 2 within passage 130 as lid 300 moves between a closed position and an open position. For example, plunger 500 may move from a sealed position (e.g., as shown in FIG. 3A) when lid 300 is in a closed position to an unsealed position (e.g., as shown in FIG. 3B) when lid 300 is in an open position. Motion of lid 300 may cause motion of plunger 500. For example, rod 508 may extend through slots 304 to rotatably couple to lid 300. Rotational motion of lid 300 may cause vertical motion of plunger 500. For example, as lid 300 rotates about axis 1, slot 304 may move in an upward direction, which also raises rod 508 that extends through slot 304. Accordingly, plunger 500 may move in an upward direction as lid 300 rotates about axis 1 and slot 304 moves in an upward direction. When plunger 500 is in the unsealed position, a flow path may be exposed through which flowable solid 600 may pass. For example, plunger 500 may have a minimum width that is less than a minimum width of passage 130 and a minimum length that is less than a minimum length of passage 130 such that a flow path is formed from dosing chamber 120 to outlet 150 when lid 300 is in the open position.

Plunger 500 may include at least one central rib 504 extending vertically along central column 502 and at least one rib 506 parallel to rib 504. In some embodiments, plunger 500 includes a first rib 504 on a first side of central column 502 and a second rib 504 on a second side of central column 502 that is opposite the first side. In some embodiments, plunger 500 includes two ribs 506 disposed on a first side of central column 502 and on opposite sides of first rib 504. Plunger 500 may include a flange 510 that is configured to contact an interior surface of lid 300 when lid 300 is in the open position. This may help ensure that flowable solid 600 is directed out of outlet 150 and prevent flowable solid 600 from entering lid 300.

Body 200 may include ledge 210 and lower portion 212 that is positioned inward relative to walls 204 of body 200. This may form an opening between dosing chamber 120 and passage 130 that is narrower than passage 130. Plunger 500 may include sealing base 512 that has a size corresponding to the opening between dosing chamber 120 and passage 130 such that sealing base 512 seals dosing chamber 120 when lid 300 is in the closed position and plunger 500 is in the sealed position. In some embodiments, plunger 500 is wedged into dosing chamber 120 at ledge 210 to seal dosing chamber 120. When plunger 500 moves to the unsealed position as lid 300 is moved to the open position, sealing base 512 may move up sufficiently to expose an outlet from dosing chamber 120 to passage 130.

Plunger 500 may include one or more spacers (e.g., spacers 514, 516, and 518) on ribs 504 or ribs 506. These spacers may be configured to contact inner walls of body 200 in passage 130. This contact may help limit plunger 500's lateral movement within passage 130 to promote proper and repeatable sealing of dosing chamber 120 when lid 300 is in the closed position. For example, the spacers may ensure that sealing base 512 remains aligned with the opening between dosing chamber 120 and passage 130.

In some embodiments, plunger 500 includes a first rib 504 on a first side of central column 502, and first rib 504 includes spacer 514. In some embodiments, plunger 500 includes a second rib 504 on a second side of central column 502 that is opposite the first side, and second rib 504 includes spacers 516 and 518.

In some embodiments, lid 300 is slidably coupled to body 200 and does not rotate, and plunger 500 is fixedly coupled to lid 300. In some embodiments, plunger 500 is integral with lid 300. In some embodiments, lid 300 may slide upward from a closed position to an open position and plunger 500 moves upward from a sealed position to an unsealed position as lid 300 moves upward from the closed position to the open position. In some embodiments, lid 300 is configured to slide upward in response to an upward force applied to lid 300.

Container 100 may be a blow-molded container or may be constructed from injection molded parts or metal components. Container 100 may be made of various materials, including one or more of a thermoplastic (e.g., high density polyethylene (HDPE), acrylonitrile butadiene styrene (ABS)), polypropylene, polystyrene, a copolyester, or a bioplastic. In some embodiments, container 100 and its components may be made of a metal (e.g., aluminum or steel). In some embodiments, container 100 may be made of a single material (e.g., HDPE or polypropylene). This allows for container 100 to be recycled in a single recycling stream without any breakdown of component parts. In some embodiments, container 100 is fully recyclable. In some embodiments, all components of container 100 (e.g., body 200, lid 300, base 400, and plunger 500) are all made of the same material. In some embodiments, all components of container 100 are made of HDPE. In some embodiments, all components of container 100 are made of polypropylene. In some embodiments, one or more components of container 100 is made of a translucent material. For example, body 200 or a portion thereof may be translucent so that the amount of flowable solid 600 remaining in container 100 is visible.

Container 100 may be a blow molded container or may be constructed from injection molded parts. Each component of container 100 (e.g., body 200, lid 300, base 400, and plunger 500) may each be a unitary structure. Container 100 may be filled with flowable solid 600 before base 400 is attached by inverting container 100 and adding flowable solid 600 to storage volume 110. After filling, base 400 maybe coupled to body 200 as described above. In embodiments when the container is not refillable, base 400 maybe permanently coupled to body 200 after filling. In embodiments when the container is refillable, base 400 may be used as a removable closure after filling.

Flowable solid 600 may be used to create a beverage by mixing a dose with water. For example, flowable solid 600 may include flavorings, electrolytes, nutritional supplements, or a combination of these. In some embodiments, flowable solid 600 is a beverage concentrate. In some embodiments, each dose of flowable solid 600 has an equal volume. Flowable solid 600 may be a powder or granules (e.g., spices, sugar, salt, beverage concentrates, hydrations powders, electrolyte powders, etc.). Container 100 may be used to dispense equal doses. Each dose may have a predetermined volume, which can be set at a volume between 0.1 mL and 60 mL. For example, a container for electrolyte powders may dispense a dose having a predetermined volume from about 0.1 mL to about 0.5 mL, a container for a beverage concentrate may dispense a dose having a predetermined volume from about 1 mL to about 30 mL, and a container for a hydration powder may dispense a dose having a predetermined volume from about 15 mL to about 60 mL.

In some embodiments, each dose of flowable solid 600 has a predetermined volume from about 0.1 mL to about 60 mL (e.g., about 0.1 mL to about 0.5 mL, about 1 mL to about 5 mL, about 2 mL to about 3 mL, about 15 mL to about 60 mL, or about 25 mL to about 35 mL). In some embodiments, each dose of flowable solid 600 has a volume of about 2.5 mL. In some embodiments, each dose of flowable solid 600 has a volume of about 30 mL.

Container 100 may dispense an accurate and consistent dose of flowable solid 600 by inverting container 100 in the direction of outlet 150. The amount of powder dosed is independent of the volume of powder remaining in the container (assuming at least enough for one full dose remains) and of the speed at which a user inverts the container.

Figure 4:
FIG. 4 illustrates a flow chart for dispensing a dose of flowable solid.
Figure 4:
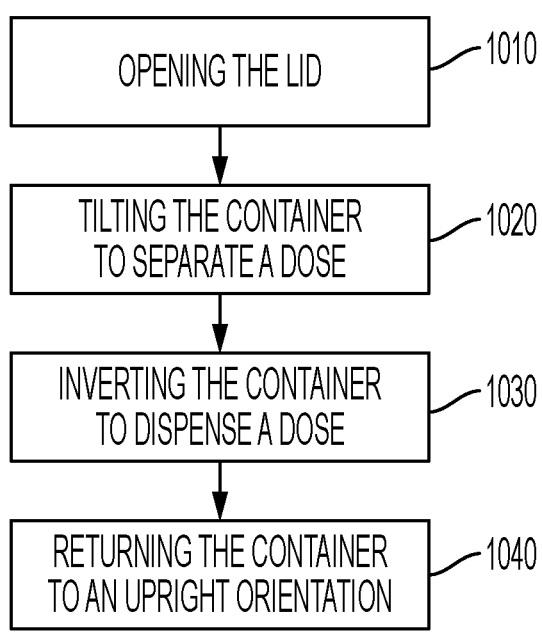

FIG. 4 is flow chart illustrating an exemplary method 1000 of how equal doses of powder are dispensed from container 100 according to some embodiments by opening container 100 and rotating container 100. FIGS. 3A-3D illustrate the process of dispensing a powder. FIG. 3A illustrates container 100 in an upright orientation with lid 300 in the closed position. As illustrated in FIG. 3A, storage volume 110 is partially filled with flowable solid 600. At step 1010, a user opens lid 300 by applying a downward pressure on the top of lid 300 proximate to flange 306 until lid 300 is in the open position and holes 314 engage with detents 214. At step 1020, a user moves container 100 from an open and upright orientation (FIG. 3B) to a tilted orientation (FIG. 3D), which separates dose 610 (previously within dosing chamber 120) of flowable solid 600 from remainder 620. Dose 610 separates from remainder 620 at corner 121 between dosing chamber 120 and storage volume 110. Partition 404 may also control the size of dose 610. For example, the height and position of partition 404 may prevent excess powder from flowing out of container 100 when the container is rotated from the upright position to the titled position. Because flowable solids can pile without slumping to varying degrees (i.e., the flowable solid's angle of repose) they do not flow as readily as a liquid. Thus flowable solid 600 has an angle of repose such that flowable solid 600 readily separates at corner 121 without appreciable variation in dose amount regardless of differences in the speed at which container 100 is rotated. However, depending on the material being dispensed, the angle of repose will vary. In some embodiments, the flowable solid has an angle of repose of at least 30 degrees. A liquid, in contrast, could flow more easily and quickly, such that the flow of the dispensed liquid does not separate and the amount of dispensed liquid could be widely varied depending on the speed at which container 100 is rotated.

At step 1030, a user moves container 100 to an inverted orientation (FIG. 3D) to dispense dose 610 of flowable solid 600. Partition 204 holds remainder 620 and prevents it from entering passage 130 in this orientation. As container 100 is rotated from the tilted orientation to the inverted orientation, dose 610 of flowable solid 600 moves along outlet passage 130 to outlet 150 and exits container 100 via outlet 150. As illustrated in FIG. 3D, dose 610 of flowable solid 600 may be dispensed into vessel 700. Vessel 700 may be any kind of vessel configured to receive flowable solid 600 (e.g., a beverage container, a cooler, a food container, a bowl, or any other suitable food or beverage container). Vessel 700 may be configured to receive a closure 710. The dose 610 of flowable solid 600 may be mixed with water in vessel 700 to make a beverage. Because of the structure of container 100 and relative positions of partition 206, storage volume 110, dosing chamber 120, and outlet passage 130, each time the container is rotated from the upright position to the inverted position, only one dose of powder (e.g., dose 610 of flowable solid 600) is dispensed. To dispense another dose of powder, a user simply rotates the container back to the upright orientation (step 1040), which causes a dose 610 to separate from remainder 620 of flowable solid 600. After separating, dose 610 falls into dosing chamber 120, and then repeats the process of rotating the container to the tilted position (step 1020) and then to the inverted position (step 1030). Each time container 100 is moved back to the upright position, a single dose (e.g., dose 610) of flowable solid 600 is disposed in dosing chamber 120. By repeating this process, a user can consistently dispense equal doses of powder each time the process is repeated, until all of the powder has been dispensed from container 100. Steps 1020 to 1040 can be repeated until storage volume 110 is empty. In other words, a user can dispense equal doses of powder as long as storage volume 100 is filled with an amount of flowable solid 600 between one dose and the capacity of storage volume 110.

In some embodiments, container 100 is in the titled orientation when it is rotated greater than 0 degrees from the upright position and less than about 115 degrees. In some embodiments, container 100 is in the inverted orientation when it is rotated greater than about 115 degrees and less than about 180 degrees from the upright orientation.

For convenience container 100 is discussed in terms of dispensing powder or granules as flowable solid 600, but it should be understood that container 100 may be filled with other products that can be dispensed in a similar way. For example, container 100 could be filled with any time of flowable solid (e.g., a granulated or powdered product) that would benefit from dispensing accurate doses (e.g., beverage concentrates, hydration powders, electrolyte powders, sugar, salt, spaces, etc.).

As used herein, the terms "upper" and "lower," and "top" and "bottom," "inner" and "outer." and the like are intended to assist in understanding of embodiments of the disclosure with reference to the accompanying drawings with respect to the orientation of the beverage closure as shown, and are not intended to be limiting to the scope of the disclosure or to limit the disclosure scope to the embodiments depicted in the Figures. The directional terms are used for convenience of description and it is understood that the system disclosed herein may be positioned in any of various orientations.

As used herein, the terms "equal volume" or "equal dose" include tolerances for minor variations from the actual dose size. For example, "equal volume" or "equal dose" may include tolerances of ±10% from the actual dose or volume.

When a value is used herein as an end-point of a range, the disclosure should be understood to include the specific value or end-point referred to. As used herein, with respect to a value or amount, the term "about" includes ±10%.

It is to be appreciated that the Detailed Description section, and not any other section, is intended to be used to interpret the claims. Other sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The breadth and scope of the present disclosure should not be limited by any of the above-described exemplary embodiments, but should be defined only in accordance with the claims and their equivalents.

What is claimed is:

1. A container for dispensing a flowable solid, the container comprising:
   a body defining an interior volume, the interior volume comprising:
      a storage volume; and
      an outlet passage; and
   a closure for sealing the container, the closure comprising:
   a lid configured move between a closed position to an open position; and
   a plunger coupled to the lid and extending within the outlet passage, wherein the plunger is configured to move from a sealed position to an unsealed position when the lid moves from the closed position to the open position, and wherein the plunger is configured to seal the outlet passage when the plunger is in the sealed position,
   wherein the container is configured to dispense a dose of the flowable solid when the plunger is in the unsealed position and the container is at least partially inverted, and
   wherein each dose has an equal volume.

2. The container of claim 1, further comprising a dosing chamber to receive a single dose of the flowable solid.

3. The container of claim 1, further comprising a central rib extending vertically along the plunger.

4. The container of claim 1, wherein the plunger exposes a flow path for dispensing a dose of the flowable solid when the lid is in the unsealed position.

5. The container of claim 1, wherein the storage volume is defined by a wall and a base portion coupled to the wall.

6. The container of claim 5, wherein the base portion is fixedly coupled to the wall.

7. The container of claim 1, wherein the storage volume is defined in part by a partition configured to restrict the flow of the flowable solid from the storage volume.

8. The container of claim 1, wherein the lid further comprises a rim configured to restrict the movement of the lid from the first position to the second position.

9. The container of claim 1, wherein the lid is rotatably coupled to the body.

10. A container for dispensing a flowable solid, the container comprising:
   a storage volume configured to hold the flowable solid,
   a dosing chamber configured to hold a dose of the flowable solid,
   a closure configured to move between a closed position and an open position, wherein the closure is configured to seal the storage volume when in the closed position, and
   a partition configured to restrict the flow of the flowable solid from the storage volume,
   wherein the container is configured to dispense a dose of equal volume of the flowable solid from the dosing chamber when the container is at least partially inverted.

11. The container of claim 10, wherein the closure comprises a plunger, wherein the plunger is configured to move up in response to the closure moving from a closed position to an open position, and wherein the plunger is configured to move down in response to the closure moving from the closed position and the opened position.

12. The container of claim 10, wherein the dosing chamber is configured to hold a dose of the flowable solid when the container when the container is upright.

13. The container of claim 11, the wherein the plunger exposes a flow path within the dosing chamber when the closure is in the open position.

14. The container of claim 10, further comprising a base portion and a wall coupled to the base portion.

15. The container of claim 14, wherein the base is fixedly coupled to the wall.

16. A container for dispensing a flowable solid, the container comprising:
   a body comprising a storage volume configured to hold the flowable solid;
   a lid coupled to the body; and
   a plunger coupled to the lid and extending within the body, wherein the plunger is configured to move upward from a closed position to an open position in response to a downward force applied to the lid.

17. The container of claim 16, wherein the container is configured to dispense a single dose of flowable solid.

18. The container of claim 16, further comprising a first portion proximate to a first end of the lid and a second portion proximate to a second end of the lid, wherein the first end is opposite to the second end, wherein the plunger is configured to move from the closed position to the open position in response to a force applied to the first portion, and wherein the plunger is configured to move from the open position to the closed position in response to a force applied to the second portion.

19. The container of claim 16, further comprising a dosing chamber in communication with the storage volume and an outlet, the dosing chamber configured to hold a dose of the flowable solid when the container is upright.

20. The container of claim 16, wherein the body further comprising:

an outlet proximate to a top end of the body; and a dosing chamber proximate to a bottom end of the body.

* * * * *